(12) United States Patent
Tokieda et al.

(10) Patent No.: US 10,352,525 B2
(45) Date of Patent: Jul. 16, 2019

(54) VEHICLE SIGNALING LIGHT

(71) Applicant: Stanley Electric Co., Ltd., Tokyo (JP)

(72) Inventors: Yuki Tokieda, Tokyo (JP); Kazuya Furubayashi, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 17 days.

(21) Appl. No.: 15/410,532

(22) Filed: Jan. 19, 2017

(65) Prior Publication Data
US 2017/0205043 A1 Jul. 20, 2017

(30) Foreign Application Priority Data

Jan. 19, 2016 (JP) ................................ 2016-008195

(51) Int. Cl.
| | |
|---|---|
| *F21V 9/00* | (2018.01) |
| *F21S 43/40* | (2018.01) |
| *F21S 43/31* | (2018.01) |
| *F21S 43/20* | (2018.01) |
| *F21S 43/239* | (2018.01) |
| *B60Q 1/26* | (2006.01) |
| *B60Q 1/34* | (2006.01) |
| *B60Q 1/00* | (2006.01) |

(Continued)

(52) U.S. Cl.
CPC ............ *F21S 43/40* (2018.01); *B60Q 1/0041* (2013.01); *B60Q 1/2607* (2013.01); *B60Q 1/34* (2013.01); *F21S 43/14* (2018.01); *F21S 43/239* (2018.01); *F21S 43/241* (2018.01); *F21S 43/243* (2018.01); *F21S 43/249* (2018.01); *F21S 43/26* (2018.01); *F21S 43/31* (2018.01); *F21Y 2115/10* (2016.08)

(58) Field of Classification Search
CPC ........ F21S 41/147; F21S 41/148; F21S 41/25; F21S 41/322; F21S 41/33; F21S 43/235; F21S 43/241; F21S 43/245; F21S 41/24; F21S 41/32233
USPC ........................................... 362/511
See application file for complete search history.

(56) References Cited

U.S. PATENT DOCUMENTS

| | | | |
|---|---|---|---|
| 8,480,266 B2* | 7/2013 | Futami | B60Q 1/0041 362/298 |
| 2004/0047161 A1* | 3/2004 | Mochizuki | F21S 43/14 362/511 |

(Continued)

FOREIGN PATENT DOCUMENTS

| | | |
|---|---|---|
| JP | 2006-93104 A | 4/2006 |
| JP | 2009-223196 A | 10/2009 |

*Primary Examiner* — Matthew J. Peerce
(74) *Attorney, Agent, or Firm* — Kenealy Vaidya LLP

(57) ABSTRACT

A DRL unit as a vehicle signaling light can include: an LED light source; and a plate light guiding lens formed from a light guide plate. The light guide plate includes: a light guide plate main body having a light output surface; and a light entrance portion that is formed to be continuous with the light guide plate main body and includes a light incident surface opposite to the light source and upper and lower expanded portions. The upper and lower expanded portions are integrally formed with the light entrance portion on top and bottom surfaces of the light entrance portion so as to expand in the thickness direction of the light guide plate main body. Here, the upper and lower expanded portions can have asymmetric cross sections in the thickness direction and different sizes when seen in a top plan view.

10 Claims, 6 Drawing Sheets

(51) Int. Cl.
    *F21S 43/14*       (2018.01)
    *F21S 43/241*     (2018.01)
    *F21S 43/243*     (2018.01)
    *F21S 43/249*     (2018.01)
    *F21Y 115/10*     (2016.01)

(56) References Cited

U.S. PATENT DOCUMENTS

| | | | |
|---|---|---|---|
| 2005/0088758 A1* | 4/2005 | Minano | F21V 7/0025 |
| | | | 359/726 |
| 2006/0062016 A1 | 3/2006 | Dejima et al. | |
| 2006/0087860 A1* | 4/2006 | Ishida | F21S 43/247 |
| | | | 362/517 |
| 2006/0146555 A1* | 7/2006 | Inaba | B60Q 1/2665 |
| | | | 362/494 |
| 2006/0269213 A1* | 11/2006 | Hwang | G02B 6/0036 |
| | | | 385/146 |
| 2009/0237910 A1 | 9/2009 | Takada et al. | |
| 2011/0085343 A1* | 4/2011 | Ohno | F21S 41/24 |
| | | | 362/510 |
| 2012/0287668 A1* | 11/2012 | Richardson | F21V 29/00 |
| | | | 362/602 |
| 2014/0036522 A1* | 2/2014 | Nakada | F21S 43/00 |
| | | | 362/511 |
| 2015/0176793 A1* | 6/2015 | Park | F21S 41/143 |
| | | | 362/511 |

* cited by examiner

VEHICLE SIGNALING LIGHT

This application claims the priority benefit under 35 U.S.C. § 119 of Japanese Patent Application No. 2016-008195 filed on Jan. 19, 2016, which is hereby incorporated in its entirety by reference.

TECHNICAL FIELD

The presently disclosed subject matter relates to a vehicle signaling light including a light source and a plate light guiding lens that outputs light by being irradiated with light from the light source.

BACKGROUND ART

Recent vehicle signaling lights such as turn signaling lamps, DRL (Day Running Lamp), etc. to be disposed on both right and left end portions of the front and rear areas of a vehicle body have utilized light emitting diodes (LED) and the like light sources, as the LEDs have high light emission efficiency and long life while consuming less power.

The LEDs having the above-described advantageous effects and serving as a light source generally emit light with high directivity. To cope with this, such an LED can be used together with a light guiding lens having an incident surface and a light output surface. In this configuration, the light with high directivity can be first caused to enter into the light guiding lens, and the light output surface of the light guiding lens can be illuminated with the entering light, as if the entire surface thereof can emit light.

For example, Japanese Patent Application Laid-Open No. 2009-223196 (or US Patent Application Publication No. 2009/0237910A corresponding to the JP publication) has proposed an indicator device including an LED and a plate light guiding lens. In this indicator device, light emitted from the LED is caused to enter into the plate light guiding lens in a direction parallel to the plate surface of the light guiding lens and be guided therethrough to the light output surface, thereby outputting the light through the light output surface. This can illuminate the linear light output surface thereof with the light as if the entire linear surface can emit light.

various illumination devices including the aforementioned indicator device have been required to be thinned in recent years. In order to cope with this demand, however, there is a certain limit to decrease the thickness of the LED for this purpose. Accordingly, Japanese Patent Application Laid-Open No. 2006-093104 (or US Patent Application Publication No. 2006/062016A corresponding to the JP publication) has proposed an illumination device including an LED 110 and a thin plate light guide plate 101 constituting a light guiding lens 100 as illustrated in FIG. 1. In this illumination device, the thin light guide plate 101 includes a light incident portion 100A opposite to the LED 110 and a light output surface 100b on the opposite side, and the light incident portion 100A includes expanded portions 102 and 103 expanded in the plate thickness direction.

Here, the light incident portion 100A of the light guiding lens 100 can have an elliptical cross section having two focal points F1 and F2 on its optical axis x. The light incident portion 100A includes a light incident surface 100a opposite to the LED 110 and disposed between the focal point F1 and the center of the ellipse. Light L1 emitted from the center of the LED 110 can be incident on the light incident surface 100a of the light guiding lens 100 while being refracted by the light incident surface 100a to enter the light incident portion 100A of the light guiding lens 100 illustrated as light L2. At that time, since the optical path through which the light L2 travels passes through the focal point F1 on the LED 110 side, the light L2 enters the light guiding lens 100 as if the light L2 has been emitted from the focal point F1. The light L2 having entered the light incident portion 100A is totally reflected off the surface of the expanded portion 102 (103) to become reflected light L3, which in turn passes through the focal point F2. Therefore, the light can effectively enter the light guide plate 101 after passing through the focal point F2.

The reflected light L3 enters the main portion of the light guide plate 101 to be light L4. The light L4 can be totally reflected by the inner surface of the light guide plate 101 repeatedly and guided toward the light output surface 100b (on the right side in FIG. 1). Finally, the light L4 can exit through the light output surface 100b, as if the entire light guiding lens 100 can emit light.

However, the light guiding lens 100 illustrated in FIG. 1 has the light incident portion 100A that is vertically symmetric in the thickness direction when seen as a cross section. In this case, the light having entered into the light guide plate 101 through the light incident portion 100A may be concentrated at a particular portion, so that point illumination may occur. As a result, the uniform illumination of the light output surface 100b cannot be achieved.

SUMMARY

The presently disclosed subject matter was devised in view of these and other problems and features in association with the conventional art. According to an aspect of the presently disclosed subject matter, a vehicle signaling light can be provided which can achieve uniform illumination of a light guiding lens.

According to another aspect of the presently disclosed subject matter, a vehicle signaling light can include: a light source; and a plate light guiding lens formed from a light guide plate. In the vehicle signaling light, the light guide plate of the light guiding lens can include: a light guide plate main body having a light output surface; and a light entrance portion that is formed to be continuous with the light guide plate main body and can include a light incident surface opposite to the light source and upper and lower expanded portions. The upper and lower expanded portions can be integrally formed with the light entrance portion on top and bottom surfaces of the light entrance portion so as to expand in a direction of a thickness of the light guide plate main body. Here, the upper and lower expanded portions can have asymmetric cross sections in the direction of the thickness and have different sizes when seen in a top plan view.

In the vehicle signaling light with the above-mentioned configuration, the light guide plate main body and the upper and lower expanded portions of the light entrance portion of the light guiding lens each can be provided with a reflective cut that is configured to reflect light, which is directly incident thereon from the light source, to the light output surface.

In the vehicle signaling light with the above-mentioned configuration, the reflective cuts provided to the respective upper and lower expanded portions can be provided to positions different from each other when seen in the top plan view.

In the vehicle signaling light with the above-mentioned configuration, the upper and lower expanded portions can each have an outer surface that constitutes a reflective surface configured to reflect light, having been reflected by the reflective cut, to the light guide plate main body.

Furthermore, the light output surface of the light guide plate main body of the light guiding lens can be formed to extend linearly.

Furthermore, the light output surface of the light guide plate main body of the light guiding lens can be provided with a plurality of lens cuts having two side surfaces which extend in the direction of the thickness and one of which are parallel to a direction in which the vehicle signaling light can output light (light output direction) and the other of which are perpendicular to the light output direction.

According to the vehicle signaling light of the presently disclosed subject matter, the upper and lower expanded portions formed in the light entrance portion of the light guiding lens can have asymmetric cross sections in the thickness direction with different sizes when seen in a top plan view. Thus, point illumination can be prevented from occurring by the light entering from a light entrance portion to a light guide plate and being concentrated at a particular portion, thereby achieving uniform illumination of the light guiding lens due to substantially uniform emission of light through the light output surface.

Furthermore, light directly entering into the light guiding lens in the direction parallel to the surface of the plate light guiding lens (plate surface direction) can be reflected by the reflective cuts formed in the light guide plate main body and the upper and lower expanded portions of the light entrance portion.

Furthermore, the reflective cuts provided to the respective upper and lower expanded portions of the light guiding lens can be provided to positions different from each other when seen in the top plan view. Therefore, the light can be output uniformly through the light output surface of the light guide plate main body. This can achieve uniform illumination of the light guiding lens while preventing uneven illumination due to point illumination.

The outer surfaces of the upper and lower expanded portions can serve as a reflective surface configured to reflect light, having been reflected by the reflective cuts of the upper and lower expanded portions, to the light guide plate main body to enter the same. Thus, point illumination can be prevented from occurring by the light entering from the light entrance portion to the light guide plate main body and being concentrated at a particular portion, thereby achieving uniform illumination of the light guiding lens.

Furthermore, when the light output surface of the light guide plate main body of the light guiding lens is formed to extend linearly, the light can be output in a linear shape, so that the intrinsic function of the vehicle signaling light can be exhibited.

Furthermore, when the light output surface of the light guide plate main body is provided with the plurality of lens cuts, the light output through the light output surface can be properly diffused by the plurality of lens cuts to achieve uniform illumination thereof. Furthermore, one side surfaces of the lens cuts that are parallel to the light output direction can reflect waste light back to the light guide plate main body. This can improve the light utilization efficiency.

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

A description will now be made below to vehicle signaling lights of the presently disclosed subject matter with reference to the accompanying drawings in accordance with exemplary embodiments.

Note that directions herein are on the basis of a posture of the vehicle signaling lights when installed in a vehicle body for use, but the front direction means a light output direction even when the vehicle signaling light is installed in a rear portion of the vehicle body to be directed to its rear side.

Figure 2:
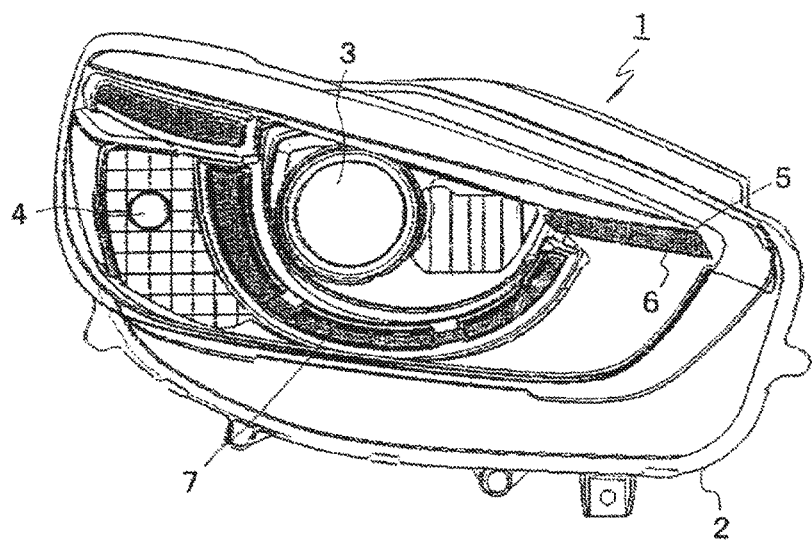
FIG. 2 is a front view of a rear-combination lighting device including a vehicle signaling light made in accordance with principles of the presently disclosed subject matter.
Figure 3:
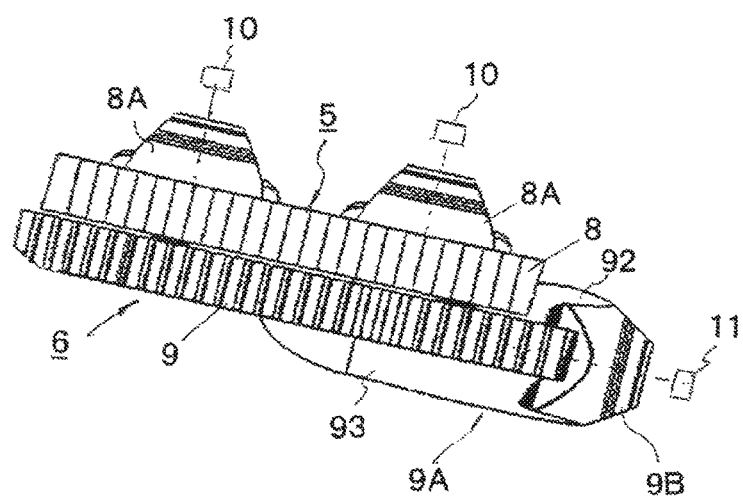
FIG. 3 is a front view of the vehicle signaling light.
Figure 4:
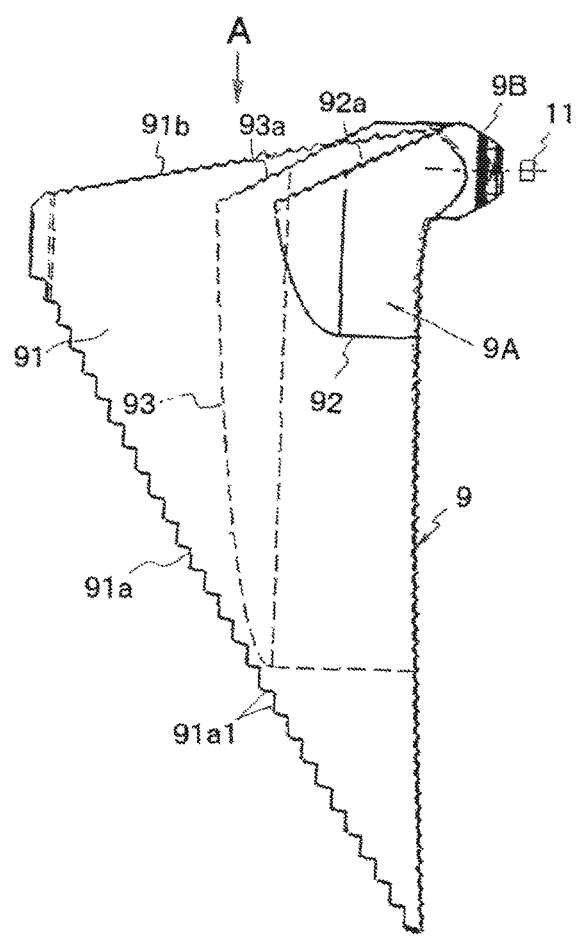
FIG. 4 is a top plan view of a light guiding lens of the vehicle signaling light.
Figure 5:
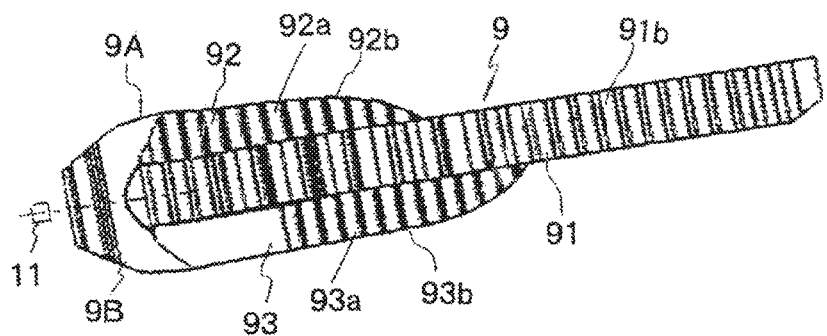
FIG. 5 is a rear view of the light guiding lens of the vehicle signaling light when seen from an arrow A in FIG. 4.

FIG. 2 is a front view of a rear-combination lighting device 1 including a vehicle signaling light made in accordance with the principles of the presently disclosed subject matter. FIG. 3 is a front of the vehicle signaling light, FIG. 4 is a top plan view of a light guiding lens included in the vehicle signaling light, and FIG. 5 is a rear view of the light guiding lens of the vehicle signaling light when seen from an arrow A in FIG. 4.

Figure 1:
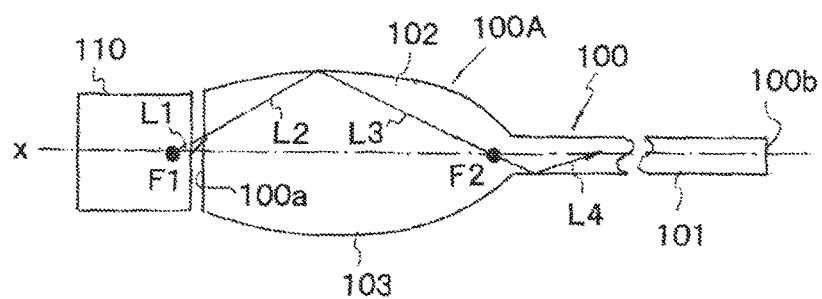
FIG. 1 is a partial cross-sectional view of a light guiding lens proposed in Japanese Patent Application Laid-Open No. 2006-093104 (or US Patent Application Publication No. 2006/062016A corresponding the JP publication)

The rear-combination lighting device 1 illustrated in FIG. 2 can be a lighting unit to be disposed in a rear portion of a vehicle body on its right and left end sides. The lighting unit to be disposed on the left end side has the same basic configuration as the lighting unit to be disposed on the right end side. Thus, one rear-combination lighting device is illustrated in FIG. 1 as the rear-combination lighting device 1 and will be described and illustrated.

The rear-combination lighting device 1 of FIG. 2 can include a housing 2 having an opening and a not-illustrated transparent outer lens for covering the opening of the housing 2 to define a lighting chamber. Further included in the lighting chamber may be a plurality of lamps having different functions, including a low-beam lamp 3 disposed at its center, a high-beam lamp 4 disposed beside the low-beam lamp 3, a turn signaling lamp 5 serving as a signaling lamp and a DRL unit 6 both disposed beside the low-beam lamp 3 on an opposite side to the high-beam lamp 4, and a positioning lamp 7 disposed to surround the low-beam lamp 3 from below. The turn signaling lamp 5 and the DRL unit 6 are, as illustrated in FIG. 3, disposed vertically adjacent to each other.

The turn signaling lamp 5 and the DRL unit 6 can include plate light guiding lenses 8 and 9, respectively, as illustrated in FIG. 3 to be stacked vertically adjacent to each other. Further included are two LED light sources 10 that can emit light rays in a direction perpendicular to a direction of the surface of the plate light guiding lens 8 (or referred to as a plate surface direction). The light guiding lens 8 of the turn signaling lamp 5 can be configured to receive the light rays emitted from the two LED light sources 10 in the direction perpendicular to the plate surface direction (from an obliquely upward direction in FIG. 3) and guide the light rays in the plate surface direction (toward the near side in the drawing). Specifically, the light guiding lens 8 can be provided with truncated conical shaped light entrance portions 8A integrally formed with the light guiding lens 8 at two locations of the top surface thereof. The respective LEDs 10 can be disposed in the vicinities of the respective light entrance portions 8A so that the light output direction of the respective LEDs 10 are perpendicular to the surface of the plate light guiding lens 8 (directed in obliquely downward direction as illustrated in FIG. 3), The light guiding lens 9 of the DRL unit 6 can output light by receiving light rays emitted from one LEI) light source 11 in a direction parallel to the plate surface direction and guiding and outputting the light rays in the direction parallel to the plate surface direction (on the near side of FIG. 3) for illumination. The light guiding lenses 8 and 9 may be formed from a transparent, light-guiding material, such as an acrylic resin or a polycarbonate resin.

Figure 6:
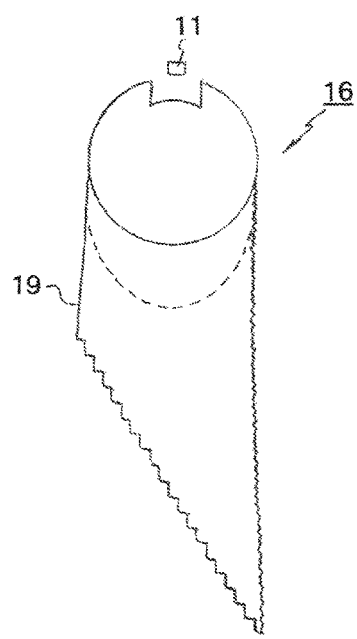
FIG. 6 is a top plan view of a light guiding lens of a vehicle signaling light according to another embodiment.

With reference to FIGS. 4 to 6, a description will now be given of the detailed configuration of the light guiding lens 9 constituting the DRL unit 6. The light guiding lens 9 can be formed from a light guide plate. Here, the light guide plate of the light guiding lens 9 can include: a light guide plate main body 91 having a light output surface 91a; and a light entrance portion 9A that is formed to be continuous with the light guide plate main body 91 and can include a light incident portion 9B opposite to the LED light source 11 and upper and lower expanded portions 92 and 93.

Specifically, the light guide plate main body 91 of the light guiding lens 9 can have a triangular planar shape as illustrated in FIG. 4. The light entrance portion 9A can be formed integrally (continuous) with the light guide plate main body 91 at a deeper end of the light guide plate main body 91 (upper side in FIG. 4). The light entrance portion 9A can be made thick in the vertical direction (or the direction perpendicular to the plate surface direction) as illustrated in FIG. 5.

The light entrance portion 9A can include the upper and lower expanded portions 92 and 93 integrally formed on the top and bottom surface sides of the light entrance portion 9A. Further integrally included is a light incident portion 9B expanded in the plate surface direction (lateral direction) at the end portion of the light entrance portion 9A. The light incident portion 9B can have a truncated conical shape to have a light incident surface. The one LED light source 11 can be disposed in the vicinity of the light incident surface of the light incident portion 9B so that the light emission direction of the LED light source 11 is parallel to the plate surface direction (in the leftward direction of FIG. 3).

In this light guiding lens 9, the upper and lower expanded portions 92 and 93 formed integrally with the light entrance portion 9A can have asymmetric cross sections in the plate thickness direction as illustrated in FIG. 5, and have difference sizes in the top plan view as illustrated in FIG. 4. Specifically, the upper expanded portion 92 can have a smaller size than the lower expanded portion 93 when seen in the top platy view as illustrated in FIG. 4, and thus, the upper expanded portion 92 is enclosed within the lower expanded portion 93 when seen from above as illustrated in FIG. 4. Furthermore, the upper and lower expanded portions 92 and 93 may not have a similar planar shape, and have respective different planar shapes as illustrated in FIG. 4.

The light output surface 91a can be formed in a linear shape on an inclined front surface of the light guide plate main body 91 of the light guiding lens 9. Here, the front surface of the light guide plate main body 91 is inclined rearward as illustrated in FIG. 4. The linear light output surface 91a can be provided with a plurality of lens cuts 91a1. The lens cuts 91a1 can each have two side surfaces which extend in the direction of the thickness and one of which is parallel to the light output direction of the vehicle signaling light and the other of which is perpendicular to the light output direction (meaning that the lens cut 91a1 has a cross section having one side parallel to the light output direction and the other side perpendicular to the light output direction).

The light guide plate main body 91 and the upper and lower expanded portions 92 and 93 of the light guiding lens 9 can each have an inclined surface on the deeper side (upper side in FIG. 4). Each of the inclined surfaces can be provided with a plurality of reflective cuts 91b, 92a, 93a that are configured to reflect light rays, emitted from the LED light source 11 in a lateral direction (from the right side to the left side in FIG. 4) and directly incident thereon, he light output surface 91a (downward in FIG. 4). As illustrated in FIG. 4, the positions (positions seen in the top plan view) of the reflective cuts 92a and 93a formed in the respective upper and lower expanded portions 92 and 93 can be different from one another. Then, the upper and lower expanded portions 92 and 93 can have outer surfaces 92b and 93b as illustrated in FIG. 5. The outer surfaces 92b and 93b can each function as a reflective surface configured to reflect light, having been reflected by reflective cuts 92a and 93a, to the light guide plate main body 91.

In the DRL unit 6 having the light guiding lens 9 with such a configuration described above, a current is supplied to the LED light source 11 to emit light rays. Then, part of the light rays emitted from the LED light source 11 and travelling in the lateral direction parallel to the plate surface direction of the light guiding lens 9 (to the left side in FIG. 4) can be incident on the light incident surface (end surface) of the light incident portion 9B to enter the light entrance portion 9A. Then, the light rays can be reflected by the reflective cuts 91b, 92a, and 93a formed in the light guide plate main body 91 and the upper and lower expanded portions 92 and 93, respectively, so as to travel to the light output surface 91a (downward in FIG. 4). The light rays having been reflected by the reflective cuts 92a and 93a of the upper and lower expanded portions 92 and 93 can impinge on the outer surfaces 92b and 93b of the expanded portions 92 and 93 serving as reflective surfaces. Thus, the light rays can be reflected by the outer surfaces 92b and 93b toward the light guide plate main body 91 to enter the same. Then, the light rays can be repeatedly totally reflected within the light guiding plate main body 91 to travel to the light output surface 91a.

Almost all of the light rays toward the light output surface 91a can projected through the light output surface 91a to the near side in FIG. 3 (downward direction in FIG. 4). At that time, the plurality of lens cuts 91a1 formed in the light output surface 91a can control the projection direction of the light rays to proper illumination directions (output directions) required as a vehicle signal light. As a result, the entire light output surface 91a of the light guiding lens 9 can be illuminated with light uniformly or can project light uniformly as if it emits light in a linear fashion. This can achieve the exhibition of the intrinsic function of the DRL unit 6.

Accordingly, in the DRL unit 6 as one exemplary embodiment of the vehicle signaling light of the presently disclosed subject matter, the upper and lower expanded portions 92 and 93 formed in the light entrance portion 9A of the light guiding lens 9 can have asymmetric cross sections in the thickness direction with different sizes when seen in a top plan view. Thus, point illumination can be prevented from occurring by the light rays entering from the light entrance portion 9A to the light guide plate main body 91 and being concentrated at a particular portion. Thus, this can achieve uniform illumination of the light guiding lens 9 due to substantially uniform emission of light rays through the light output surface 91a of the light guide plate main body 91.

Furthermore, the reflective cuts 92a and 93a provided to the respective upper and lower expanded portions 92 and 93 of the light guiding lens 9 can be provided to positions different from each other when seen in the top plan view. Therefore, the light rays can be output uniformly through the light output surface 91a of the light guide plate main body 91. This can achieve uniform illumination of the light guiding lens 9 while preventing uneven illumination due to point illumination.

Furthermore, in this exemplary embodiment, the outer surfaces 92b and 93b of the upper and lower expanded portions 92 and 93 can serve as a reflective surface configured to reflect light rays, having been reflected by the reflective cuts 92a and 93a of the upper and lower expanded portions 92 and 93, to the light guide plate main body 91 to enter the same. Thus, point illumination can be prevented from occurring by the light rays entering from the light entrance portion 9A to the light guide plate main body 91 and being concentrated at a particular portion, thereby achieving uniform illumination of the light guiding lens 9.

Furthermore, since the light output surface 91a of the light guide plate main body 91 is provided with the plurality of lens cuts 91a1, the light rays output through the light output surface 91a can be properly controlled in the desired light output directions required as a vehicle signaling light by the plurality of lens cuts 91a1 to achieve uniform illumination thereof. Furthermore, light rays reflected by one side surfaces of the lens cuts 91a1 that are parallel to the light output direction can reflect waste light back to the light guide plate main body 91. This can improve the light utilization efficiency as additional effects.

Heretofore, the illustrated exemplary embodiment has dealt with the DRL unit 6 including the light guiding lens 9 receiving light rays from a direction perpendicular to the light output direction. However, the presently disclosed subject matter can encompass other exemplary embodiments of, for example, a vehicle signaling light 16 as illustrated in FIG. 6 as a plan view. In this exemplary embodiment, the vehicle signaling light 16 can include a light guiding lens 19 and an LED light source 11 wherein the light input direction coincides with the light output direction.

Furthermore, the illustrated exemplary embodiment has dealt with the DRL unit 6 including light guiding lens 9. However, the presently disclosed subject matter can encompass other exemplary embodiments of any vehicle signaling lights having a similar light guiding lens.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicle light comprising:
   a light source; and
   a plate light guiding lens formed from a light guide plate, the light guide plate of the light guiding lens including a light guide plate main body having a light incident surface located adjacent and facing the light source such that light emitted from the light source enters the light guide plate main body in a light emission direction and travels from the light incident surface to a light output surface configured to output light in a light output direction different than the light emission direction, the light output direction being in a same plane as the light emission direction, and the light guide plate having a light entrance portion that is formed to be continuous with the light guide plate main body and includes upper and lower expanded portions as well as the light incident surface, wherein
   the upper and lower expanded portions are integrally formed with the light entrance portion on top and bottom surfaces of the light entrance portion so as to expand from the light guide plate main body in a thickness direction perpendicular to the light emission direction and light output direction of the light guide plate main body, and
   the upper and lower expanded portions have asymmetric cross sections viewed perpendicular to the light emission direction and along the light output direction, and have different sizes when viewed in a top plan view perpendicular to both the light emission direction and light output direction, such that thickness of the light guide plate in a direction perpendicular to both the light emission direction and light output direction is reduced at a location spaced further from the light source as compared to a location spaced closer to the light source, wherein
   the light output surface of the light guide plate main body of the light guiding lens is provided with a plurality of lens cuts having two side surfaces which extend in the thickness direction and one of which is parallel to the light output direction and the other of which is perpendicular to the light output direction.

2. The vehicle light according to claim 1, wherein the light guide plate main body and the upper and lower expanded portions of the light entrance portion of the light guiding lens are each provided with a reflective cut that is configured to reflect light, which is directly incident thereon from the light source, to the light output surface.

3. The vehicle light according to claim 2, wherein the reflective cuts provided to the respective upper and lower expanded portions are provided to positions different from each other when seen in the top plan view.

4. The vehicle light according to claim 2, wherein the upper and lower expanded portions have upper and lower outer surfaces that each include a reflective surface configured to reflect part of light, having been reflected by the reflective cut, in an upper and lower direction to the light guide plate main body.

5. The vehicle light according to claim 3, wherein the upper and lower expanded portions have upper and lower outer surfaces that each include a reflective surface configured to reflect part of light, having been reflected by the reflective cut, in an upper and lower direction to the light guide plate main body.

6. The vehicle light according to claim 1, wherein the light output surface of the light guide plate main body of the light guiding lens is formed to extend linearly.

7. The vehicle light according to claim 2, wherein the light output surface of the light guide plate main body of the light guiding lens is formed to extend linearly.

8. The vehicle light according to claim 3, wherein the light output surface of the light guide plate main body of the light guiding lens is formed to extend linearly.

9. The vehicle light according to claim 4, wherein the light output surface of the light guide plate main body of the light guiding lens is formed to extend linearly.

10. The vehicle light according to claim 5, wherein the light output surface of the light guide plate main body of the light guiding lens is formed to extend linearly.

\* \* \* \* \*